(12) United States Patent
Hiraiwa (10) Patent No.: US 8,567,583 B2
(45) Date of Patent: Oct. 29, 2013

(54) SHIFT DEVICE ADAPTED FOR TRANSMISSION

(75) Inventor: Kazuyoshi Hiraiwa, Yokohama (JP)

(73) Assignee: Kyowa Metal Works Co., Ltd., Yokohama-Shi (JP)

( * ) Notice: Subject to any disclaimer, the term of this patent is extended or adjusted under 35 U.S.C. 154(b) by 617 days.

(21) Appl. No.: 12/748,715

(22) Filed: Mar. 29, 2010

(65) Prior Publication Data
US 2010/0252386 A1  Oct. 7, 2010

(30) Foreign Application Priority Data
Apr. 3, 2009  (JP) ................................. 2009-090905

(51) Int. Cl.
*F16D 23/06*  (2006.01)

(52) U.S. Cl.
USPC ................. 192/53.31; 192/53.343; 192/48.91

(58) Field of Classification Search
USPC .......... 192/53.3, 53.31, 53.34–53.343, 48.91; 74/339
See application file for complete search history.

(56) References Cited

U.S. PATENT DOCUMENTS

| 2,221,901 | A | * | 11/1940 | Barr | ......................... | 192/53.343 |
| 3,548,983 | A | | 12/1970 | Hiraiwa | | |
| 4,836,348 | A | * | 6/1989 | Knodel et al. | ........... | 192/53.341 |
| 5,507,376 | A | * | 4/1996 | Skotnicki | .................... | 192/48.91 |
| 5,544,727 | A | * | 8/1996 | Braun | ......................... | 192/48.91 |
| 2003/0111313 | A1 | * | 6/2003 | Fernandez | ................. | 192/48.91 |
| 2007/0029155 | A1 | * | 2/2007 | Hiraiwa | ..................... | 192/53.31 |
| 2007/0199786 | A1 | * | 8/2007 | Hiraiwa | ..................... | 192/53.34 |
| 2008/0066568 | A1 | * | 3/2008 | Hackl et al. | ..................... | 74/339 |

FOREIGN PATENT DOCUMENTS

| JP | 45-35684 | 11/1970 |
| JP | 2006-226515 | 8/2006 |

* cited by examiner

*Primary Examiner* — David D Le
*Assistant Examiner* — Terry Chau
(74) *Attorney, Agent, or Firm* — Wenderoth, Lind & Ponack, L.L.P.

(57) ABSTRACT

A shift device includes a shaft, a hub, a sleeve, a pair of speed gears sandwiching the hub, a first synchronizer ring, a second synchronizer ring, a plurality of thrust pieces disposed in cut-off portions of the hub and a pair of springs pushing the thrust pieces outwardly in a radial direction toward the sleeve. The thrust pieces move together with the sleeve when the sleeve is moved toward the one of the speed gears, while the thrust pieces moves inwardly in the radial direction against the first and second springs when the sleeve is moved halfway toward the other of the speed gears so that the thrust pieces move in an axial direction and swing to provide different self-servo functions according to the above shift directions when they contact with the hub.

16 Claims, 11 Drawing Sheets

SHIFT DEVICE ADAPTED FOR TRANSMISSION

BACKGROUND OF THE INVENTION

1. Field of the Invention

The present invention relates to a shift device adapted for a transmission in which pushing force applied to a sleeve can be amplified into larger pushing force acting on a synchronizer ring while gears of the transmission are shifted, thereby decreasing operating force necessary for a driver or an actuator.

2. Description of the Related Art

A shift device adapted for a transmission of this kind is disclosed in Japanese Examined Patent Application Publication No. 45-35684. This conventional shift device includes a hub, a sleeve, thrust plates and a synchronizer ring, where the sleeve (or the thrust plates) is formed with slanted surfaces so that the slanted surfaces can change a part of friction torque generated between the sleeve (or the thrust plates) and the hub into thrust acting on the synchronizer ring, thereby increasing synchronizing performance.

In this conventional shift device, the slanted surfaces of the hub need to be formed in the vicinity of a central portion in an axial direction thereof, which causes a problem in that a manufacturing process for forming the slanted surfaces on the hub becomes difficult, consequently increasing its manufacturing costs. Incidentally, the slanted surfaces are indicated by reference number 44 in FIG. 2 and FIG. 17 of Japanese Examined Patent Application Publication No. 45-35684.

In order to remove such a problem, the inventor has suggested a shift device with a hub which has a shape easy to be formed by a sintering method and the like, which is disclosed in Japanese Unexamined Patent Application Publication No. 2006-226515.

This improved shift device, however, has the following problem.

The suggested shift device has the hub in a shape easy to be formed by a sintering method or the like, improving synchronization performance, but it has the same-extent self-servo functions in shift operations to one gear and the other gear arranged at opposite side of the hub. In general, required synchronization performances of shift devices are varied according to transmission gear ratios, namely speed ratios. As a result, there is a problem in that the improved shift device cannot properly accommodate synchronization performances to a shift device that needs to shift between different self-servo functions including only one self-servo function at one-side speed gear. In order to properly accommodate different self-servo functions, six thrust pieces are needed, consequently increasing its manufacturing costs.

It is, therefore, an object of the present invention to provide a shift device adapted for a transmission which overcomes the foregoing drawbacks and can provide different self-servo functions between shift operations to one-side speed gear and the other-side speed gear, decreasing manufacturing costs of the shift device.

SUMMARY OF THE INVENTION

According to a first aspect of the present invention there is provided a shift device adapted for a transmission, which includes a shaft for transmitting drive power, a hub, a sleeve, a pair of speed gears, a first synchronizer ring, a second synchronizer ring, a plurality of thrust pieces and a pair of springs. The hub has a boss portion splined with the shaft, a ring portion located outwardly away from the boss portion and formed on an outer peripheral surface thereof with splines, and a flange portion connecting the boss portion and the ring portion. The ring portion and the flange portion are formed with a plurality of cut-off portions having one-side two edge portions and the other-side two edge portions. The one-side two edge portions have first slanted surfaces for changing rotational force to thrust. The sleeve is provided on an inner surface thereof with splines and a plurality of depressed portions having a pressing surface, a first slanted surface and a second slated surface. The sleeve is supported by and slidable along the splines of the hub. The speed gears are arranged to sandwich the hub and each having splines engageable with the splines of the sleeve and a friction surface at hub sides of the speed gears. The first synchronizer ring has a friction surface on an inner surface and first grooves on an outer surface. The friction surface of the first synchronizer ring is pressable on the friction surface of one of the speed gears. The first grooves have a baulked slanted-surface on the outer surface and extending in an axial direction of the shift device. The first synchronizer ring is arranged between the hub and the one of the speed gears. The second synchronizer ring has a friction surface on an inner surface, splines and second grooves on an outer surface. The friction surface of the second synchronizer ring is pressable on the friction surface of the other of the speed gears. The splines have chamfers, the second grooves extending in the axial direction. The second synchronizer ring is disposed between the hub and the other of the speed gears. The thrust pieces have a pressed surface and a slanted surface which are contactable with the pressing surface and the first slanted surface of the sleeve on an outer surface to be pressed in the axial direction, respectively. The thrust pieces are formed with baulked surface contactable with the baulked slanted-surface of the first synchronizer ring and formed with a first servo slanted surface contactable with one of the first slanted surfaces of the hub. The thrust pieces are insertable into the depressed portions of the sleeve, the first grooves of the first synchronizer ring and the second grooves of the second synchronizer ring. The thrust pieces are disposed in the cut-off portions of the hub to be slidable in the cut-off portions in the axial direction, respectively. The thrust pieces are pushed by the springs outwardly in a radial direction of the shift device. The thrust pieces move together with the sleeve when the sleeve is moved all the way along a movement of the sleeve toward the one of the speed gears, where the pressed surface of the thrust pieces contacts with the pressing surface of the sleeve to press the first synchronizer ring during a synchronization operation. On the other hand, the thrust pieces moves inwardly in the radial direction against the first and second springs, and the slanted surface of the thrust pieces contacts with the second slanted surface of the sleeve for the thrust pieces to be prevented from further moving after the second synchronization operation when the sleeve is moved halfway toward the other of the speed gears.

Therefore, the shift device of the invention can provide different self-servo functions between shift operations to one-side speed gear and the other-side speed gear, decreasing manufacturing costs of the shift device.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Throughout the following detailed description, similar reference characters and numbers refer to similar elements in all figures of the drawings, and their descriptions are omitted for eliminating duplication.

Figure 1:
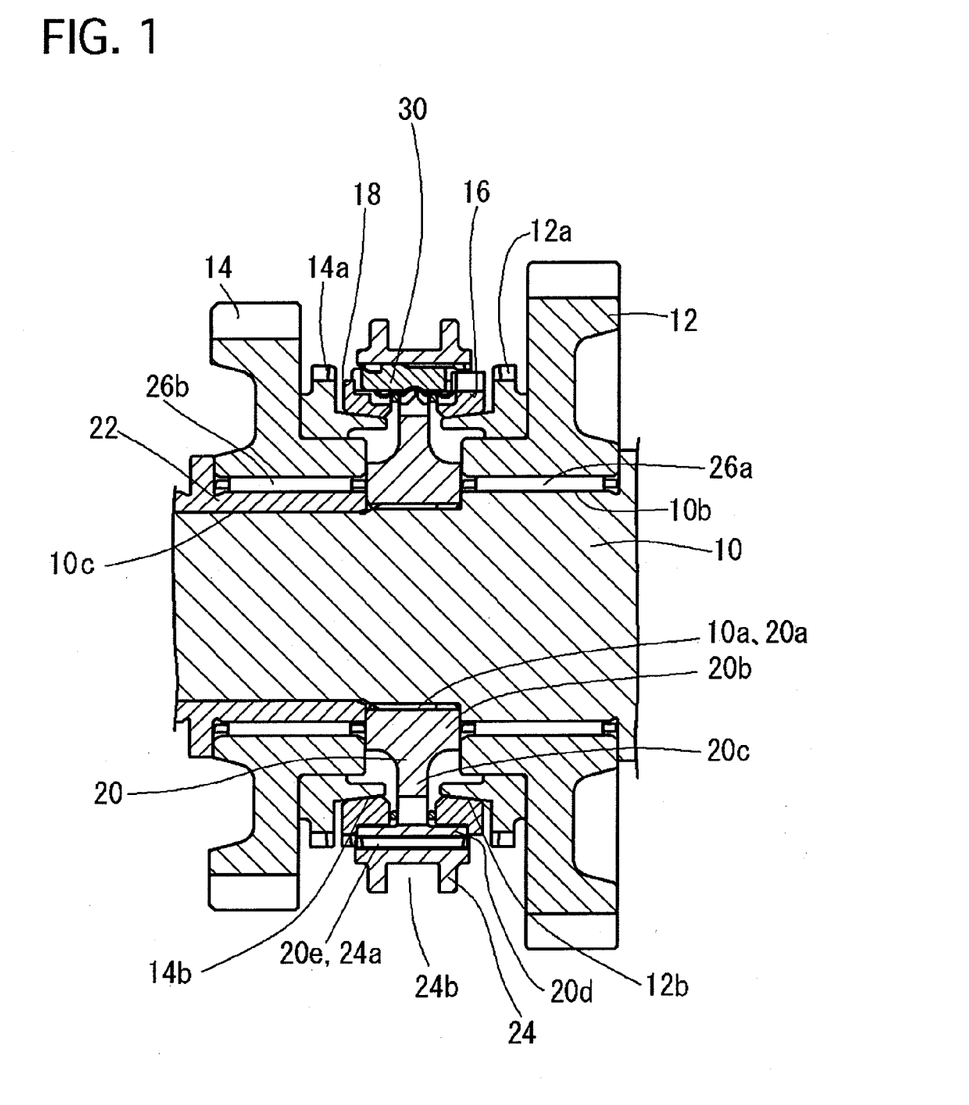
FIG. 1 is a cross-sectional plan view, taken along line Z-Z in FIG. 2, showing a shift device adapted for a transmission of a first embodiment according to the present invention, the shift device being used for first speed and second speed.
Figure 2:
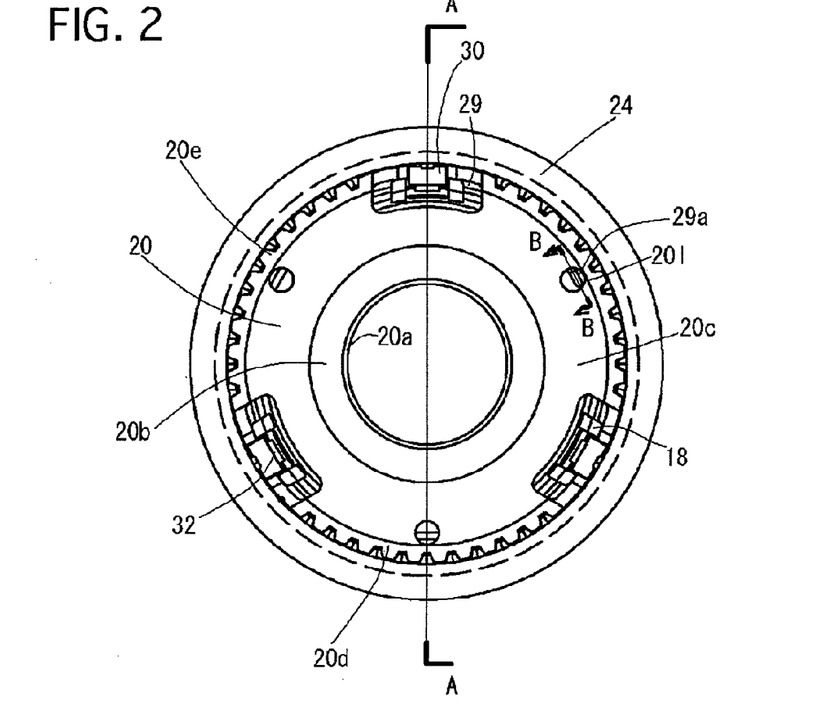
FIG. 2 is a front view showing a hub, a sleeve, a synchronizer ring and three thrust pieces pushed by springs outwardly in a radial direction of the shift device, which are used in the shift device of the embodiment shown in FIG. 1.
Figure 3:
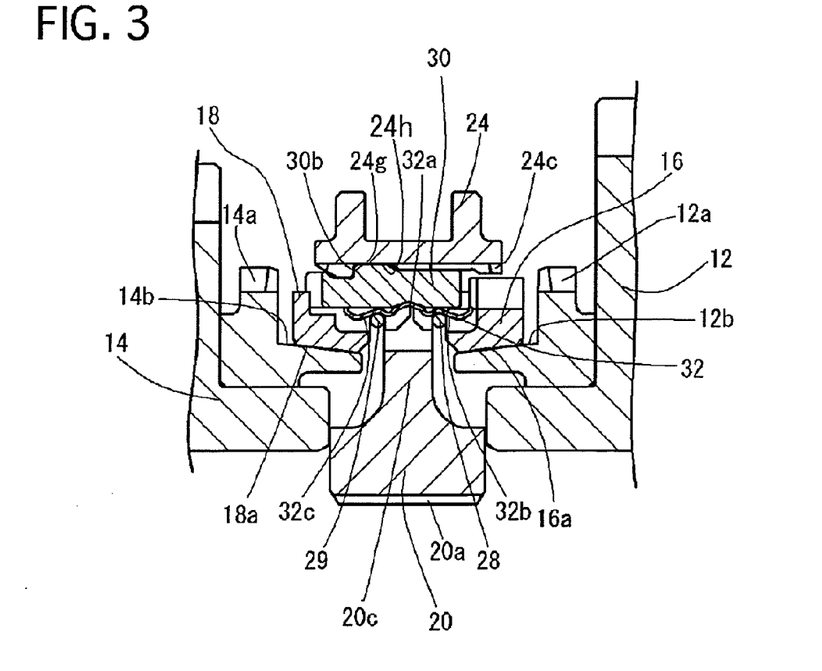
FIG. 3 is an enlarged cross-sectional plan view showing a main part of the shift device shown in FIG. 1.

Referring to FIGS. 1 to 3 of the drawings, there is shown a shift device of a first preferred embodiment according to the present invention. The shift device is adapted for a transmission mounted on a motor vehicle to establish a first speed, a second speed and a neutral state in this embodiment.

The shift device includes an output shaft 10, a first speed gear 12, a second speed gear 14, a first synchronizer ring 16, a second synchronizer ring 18, a sleeve 24 and three thrust pieces 30.

The output shaft 10 is connected with drive wheels through not-shown differential gears. The output shaft 10 is formed on its outer surface of a central portion with splines 10a, which mesh with splines 20a formed on an inner surface of a boss portion 20b of a hub 20. A large-diameter portion 10b of the output shaft 10 rotatably supports the first speed gear 12 through a needle bearing 26a, while a small-diameter portion 10c of the output shaft 10 is fitted on its outer surface with a bush 22. The bush 22 rotatably supports the second speed gear 14 through a needle bearing 26b, and it fixes the hub 20 between the bush 22 and the large diameter portion 10b in an axial direction of the shift device.

The first speed gear 12 and the second sped gear 14 are respectively meshed with not shown input-side speed gears which are connectable with a not-shown engine through a not-shown clutch. The first speed gear 12 and the second speed gear 14 are always rotated by the input gears as far as the engine is activated and the clutch is engaged. The first speed gear 22 and the second speed gear 14 correspond to a pair of speed change gears of the present invention.

The first speed gear 12 has splines 12a and a cone-shaped friction surface 12b on a hub-side potion thereof, and similarly the second speed gear 14 has splines 14a and a cone-shaped friction surface 14b on a hub-side portion thereof. The splines 12a and 14a are selectively engagible with splines 24a formed on an inner surface of the sleeve 24 when the sleeve 24 is moved to a first speed position and a second speed position, respectively. The splines 24a of the sleeve 24 always engage with splines 20e formed on an outer circumferential surface of the hub 20 in such a way that the sleeve 24 is supported by the hub 20, being slidable in the axial direction.

The sleeve 24 is formed on its outer surface with a circumferential groove 24b, in which a not-shown shift fork is partially inserted. The shift fork is capable of moving in the axial direction by a manual operation of a not-shown shift lever by a driver or a mechanical operation of a not-shown actuator. The lengths and position relationship among the splines 24a of the sleeve 24, the splines 12a of the first speed gear and the splines 14a of the second speed gear 14 are designed so that the splines 24a are free from the splines 12a and 14a at a neutral position, the splines 24a engage with the splines 12a, being free from the splines 14a, at a first speed position, and the splines 24a engage with the splines 14a, being free from the splines 12a, at a second speed position.

A first synchronizer ring 16 and the second synchronizer ring 18 are respectively arranged between the hub 20 and the first speed gear 12 and between the hub 20 and the second speed gear 14 in the axial direction. The first synchronizer ring 16 has a friction surface 16a, which faces to the friction surface 12b of the first speed gear 12, on its inner surface to provide synchronization function therebetween when they are pressed to each other and their rotational speeds differ from each other. Similarly, the second synchronizer ring 18 has a friction surface 18a, which faces to the friction surface 14b of the second speed gear 18, on its inner surface to provide synchronization function therebetween when they are pressed to each other and their rotational speeds differ from each other.

Three thrust pieces 30 are respectively arranged in cut-off portions 20f of the hub 20 in a state where they can move in the axial direction. The thrust pieces 30 are further arranged between the first synchronizer ring 16 and the second synchronizer ring 18 in the axial direction and between bottoms of the cut-off portions 20f of the hub 20 and the sleeve 24 in a radial direction of the shift device. A first spring 28 and a second spring 29, which are formed like a C shape, are arranged at both sides of the hub 20, respectively, to push the thrust pieces 30 outwardly in the radial direction toward the sleeve 24.

Hereinafter, detailed constructions of the hub 20, the sleeve 24, the synchronizer rings 16 and 18 and the thrust pieces 30 will be described.

Figure 4:
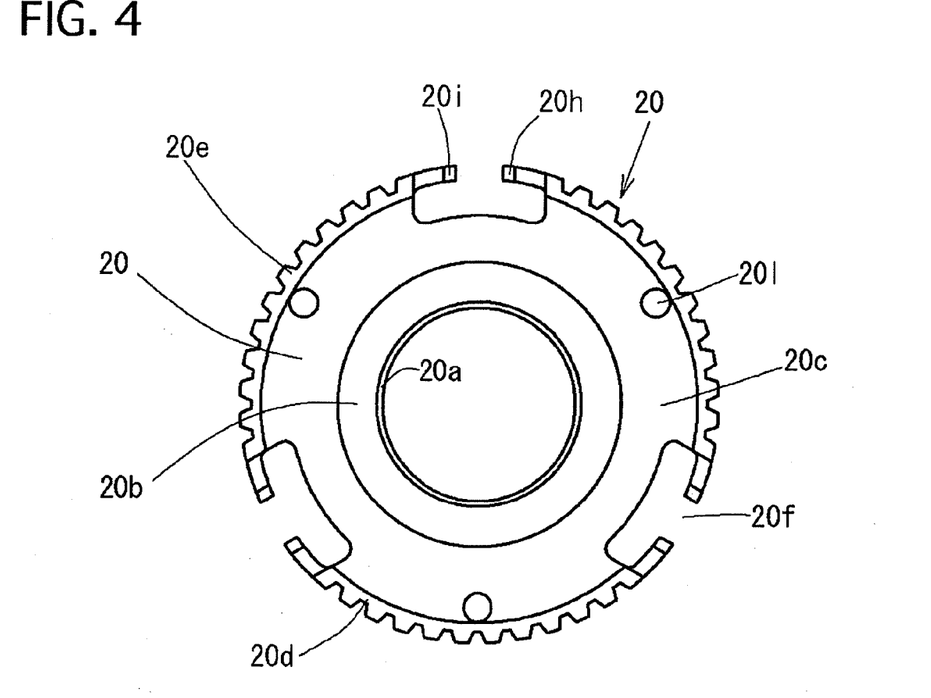
FIG. 4 is an enlarged fragmentary front view showing the hub of the shift device shown in FIG. 1, seen from a first speed gear side.
Figure 5:
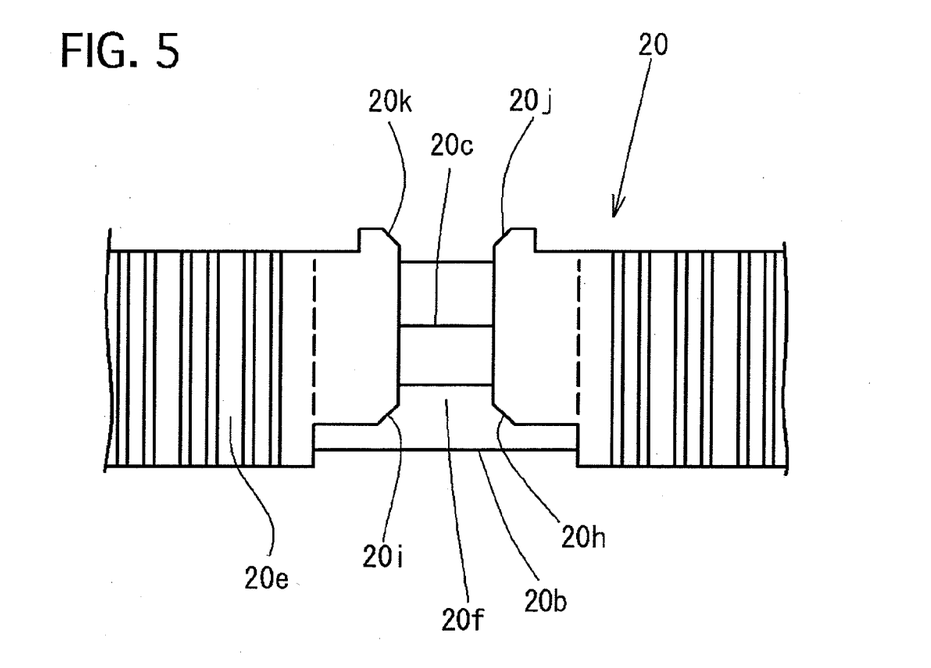
FIG. 5 is a development-elevated fragmentary view showing an outer peripheral part of the hub shown in FIG. 4, seen from the outside of the hub in the radial direction.
Figure 6:
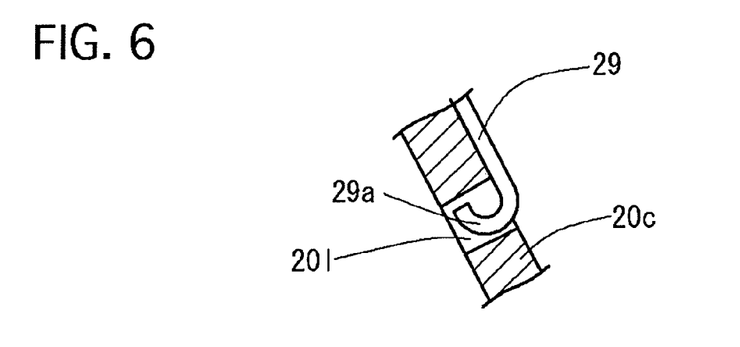
FIG. 6 is an enlarged fragmentary front view showing the sleeve used in the select device shown in FIG. 1.

FIGS. 4-6 show the hub 20, which is formed by a sintering method to have the boss portion 20b, a flange portion 20c that extends from the boss portion 20b outwardly in the radial direction, and an annular portion 20d formed at an outer circumference of the flange portion 20c. An outer circumferential surface of the annular portion 20d is formed with the splines 20e, which always engage with the splines 24a of the sleeve 24. Accordingly, the sleeve 24 is supported by the hub 20, being rotated together with the hub 20 that is integrally connected with the output shaft 10.

The cut-off portions 20f are formed in the flange portion 20c and the annular portion 20d at three positions around the circumference thereof, being evenly spaced apart along the circumference of the hub 20, to receive the thrust pieces 30, respectively, as shown in FIG. 4. As shown in FIG. 5, four axial-directional edge portions of each cut-off portion 20f have first slanted surfaces 20h and 20i at one side thereof and second slanted surfaces 20j and 20k at the other side thereof. The first slanted surfaces 20h and 20i are apart from the second slanted surfaces 20j and 20k in the axial direction, the first slanted surfaces 20h and 20i are apart from each other in a circumferential direction of the hub 20, and the second slanted surfaces 20j and 20k are apart from each other in the circumferential direction. The first and second slanted surfaces 20h, 20i, 20j and 20k have profiles that change rotational force applied from the thrust pieces 30 to the hub 20 into thrust pressing the thrust pieces 30 in the axial direction, when the rotational force acts on the thrust pieces 30 in a state where the thrust pieces 30 contact with the first slanted surfaces 20h and 20i and the second slanted surfaces 20j and 20k of the hub 20.

As shown in FIG. 4, the flange portion 20c of the hub 20 is further formed with three axial through-holes 201 at three positions around the circumference to hold the first and second springs 28 and 29. As shown in FIG. 6, one end potion 29a of the second spring 29, which is bent, is inserted and held in one of the through-holes 201 so that the second spring 29 is restricted from moving in the rotational direction thereof. Similarly, one end portion of the first spring 28, which is bent, is inserted and held in another of the through-holes 201 so that the first spring 28 is restricted from moving in the rotational direction thereof.

Figure 7:
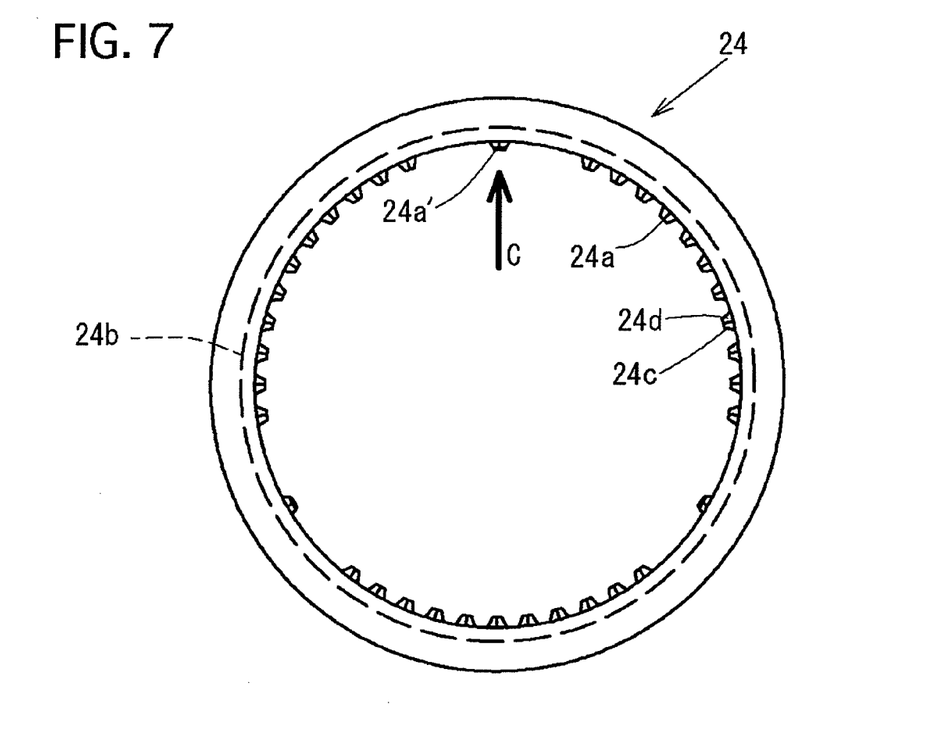
FIG. 7 is a cross-sectional view showing the synchronizing ring, taken along the line Z-Z in FIG. 2.
Figure 8:
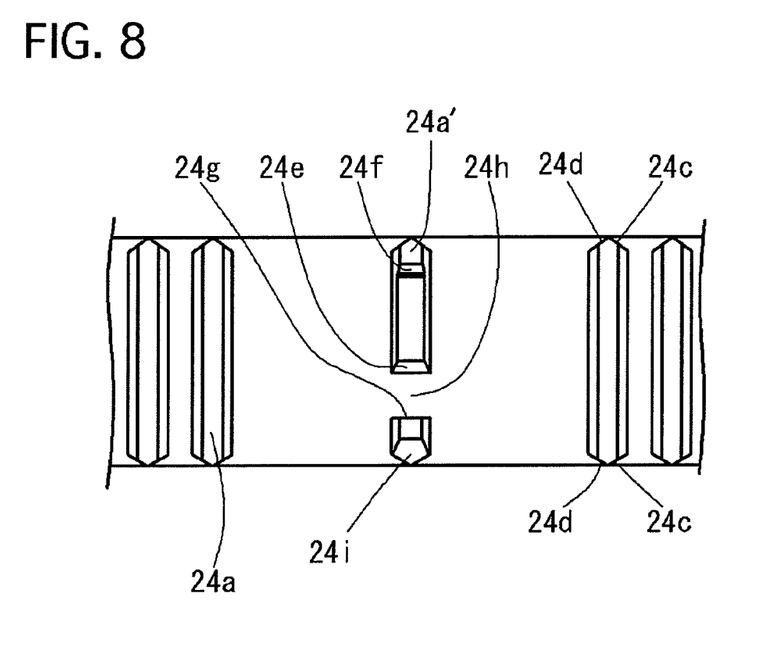
FIG. 8 is an enlarged fragmentary front view showing the synchronizer ring.

FIGS. 7 and 8 show the sleeve 24, which is formed as an annular member. The splines 24a are formed on an inner surface of the sleeve 24 and they extend in the axial direction to be selectively engageable with the splines 12a of the first speed gear 12 and the splines 14a of the second speed gear 14. Both the axial end portions of the splines 24a have chamfers 24c and 24d, inclined angles of which are opposite to each other.

Three splines, which are arranged at three positions around the circumference of the sleeve 24, among the splines 24a are modified as engageable splines 24a'. Four splines (two splines at one side and two splines at the other side) next to each modified spline 24a' on both sides are cut off so as to match the sleeve 24 to the profile of the hub 20 and avoid interference of the sleeve 24 and the hub 20.

Each engageable spline 24a' also has chamfers 24c and 24d at both the axial end portions thereof, and it is further formed with a depressed portion 24h having a first slanted surface 24e, a second slanted surface 24f and a pressing surface 24g at its intermediate portion, and with a third slanted surface 24i at a third-slanted-surface-side on one of the axial end portions. The pressing surface 24g is formed perpendicularly to the outer surface of the sleeve 24, being stepped in the axial direction. The first slanted surface 24e and the second slanted surface 24f are slanted in the axial direction. The second slanted surface 24f corresponds to a stepped portion of the present invention.

Figure 9:
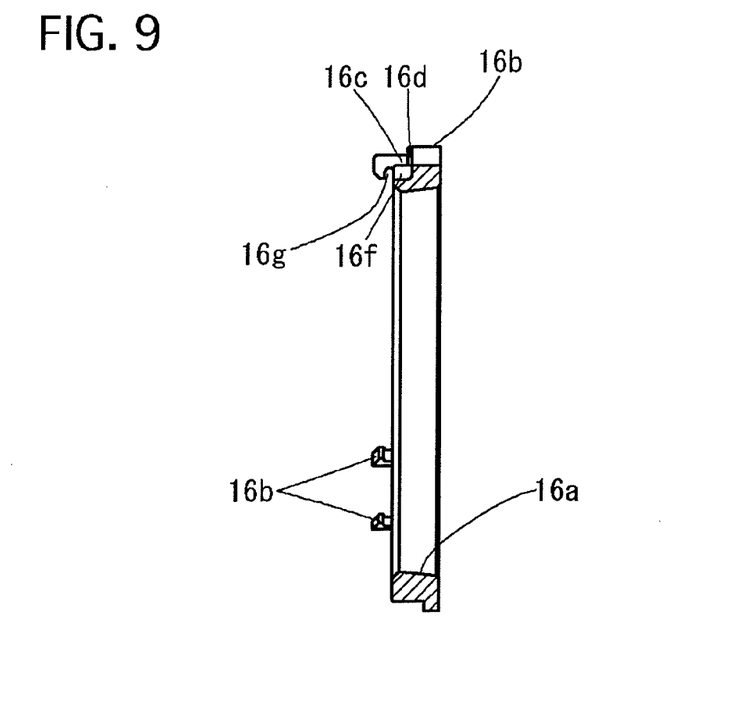
FIG. 9 is an enlarged fragmentary cross-sectional view of the synchronizer ring shown in FIGS. 7 and 8.
Figure 10:
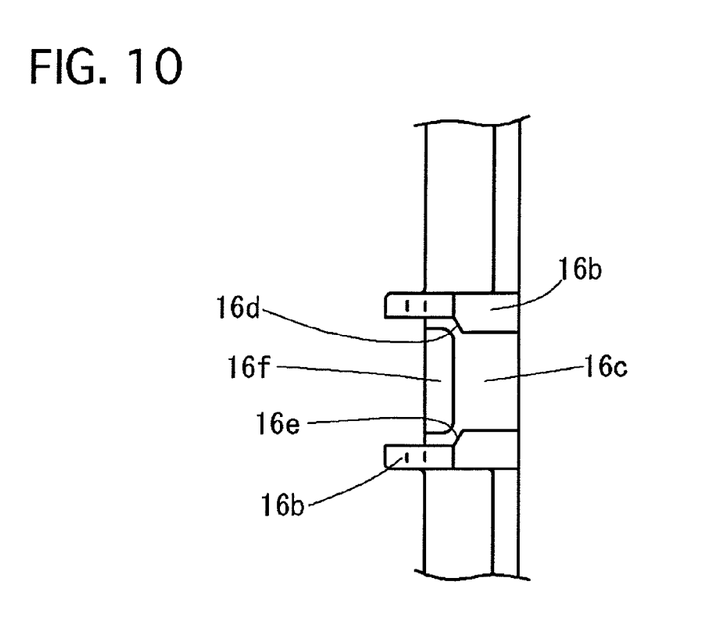
FIG. 10 is a development-elevated fragmentary view showing the synchronizer ring, seen from the outside of the synchronizer ring in the radial direction.

FIGS. 9-10 show the first synchronizer ring 16. The first synchronizer ring 16 is formed with the cone-shaped friction surface 16a on its inner surface, and with projecting portions 16b at three positions around the circumference so as to correspond to the cut-off portions 20f of the hub 20. The projecting portions 16b extend outwardly in the radial direction and in the axial direction toward the hub 20. Each projecting portion 16b is formed with a first groove 16c and a hollow portion 16f at a center position the projecting portion 16b, having baulking slanted-surfaces 16d and 16e. The projecting portions 16b are inserted in the cut-off portions 20f of the hub 20, respectively, having a certain play therebetween in a rotational direction of the first synchronizer ring 16. Each first groove 16c receives the thrust piece 30 with a certain play therebetween in the rotational direction. On inner portions of the projecting portions 16b, a spring holding groove 16b is formed so as to hold the first spring 28.

Figure 11:
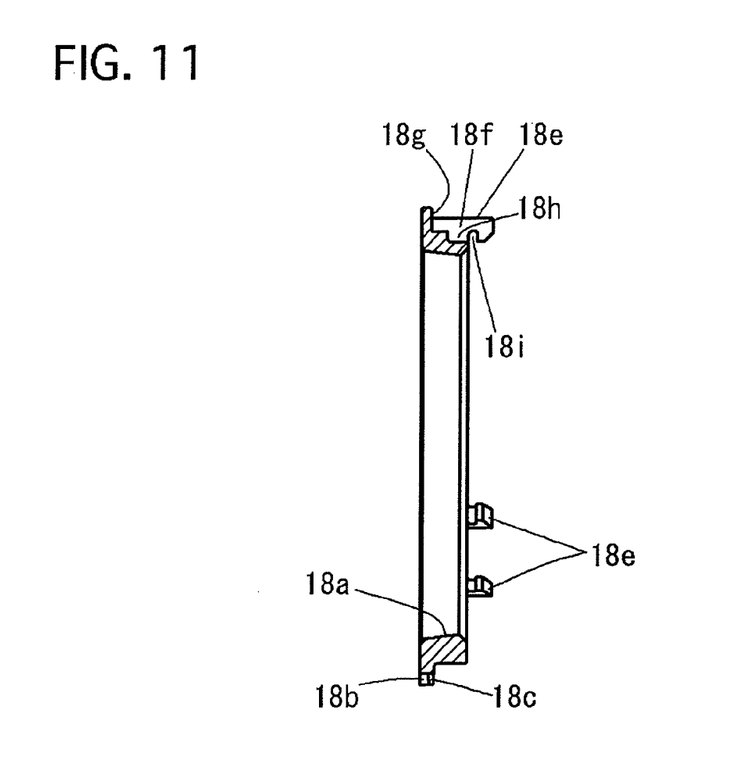
FIG. 11 is an enlarged cross-sectional view showing a thrust piece used in the shift device shown in FIGS. 1 and 2.
Figure 12:
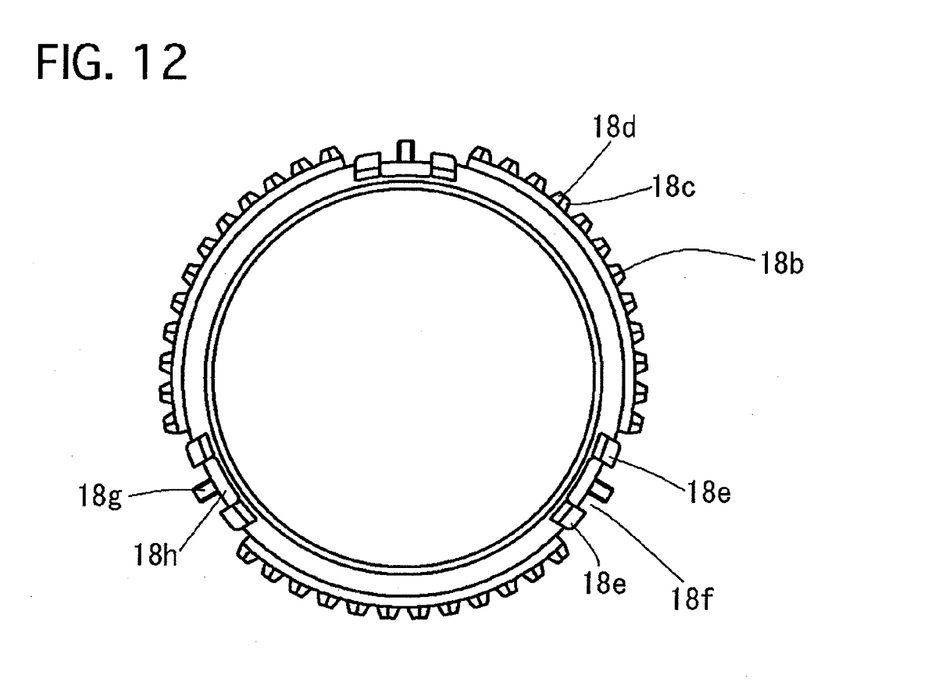
FIG. 12 is a development-elevated view showing the thrust piece shown in FIG. 11, seen from the outside in the radial direction.
Figure 13:
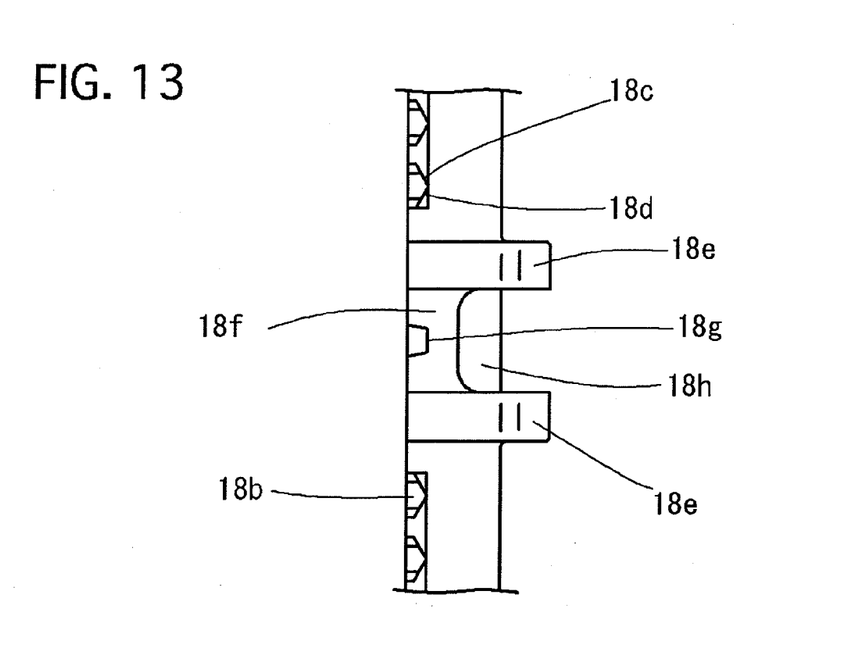
FIG. 13 is a front view showing the thrust piece shown in FIGS. 11 and 12.

FIGS. 11-13 show the second synchronizer ring 18. The second synchronizer ring 18 is formed with the cone-shaped friction surface 18a on its inner surface, and with the splines 18b on its outer circumferential surface. The splines 18b have chamfers 18c and 18d, inclined angles of which are opposite to each other, at the hub side thereof. The chamfers 18c and 18d correspond to the chamfers 24c and 24d formed on the second-speed-gear-side end portions of the splines 24a of the sleeve 24.

As shown in FIG. 13, pairs of projecting portions 18e are formed to extend in the axial direction and outwardly in the radial direction from the outer circumferential surface of the second synchronizer ring 18, being positioned at three positions around the circumference thereof so as to correspond to the cut-off portions 20f of the hub 20.

A second groove 18f is formed between the pair of projecting portions 18e. At the second-speed-gear-side portion of the second groove 18f, a pressed portion 18g is formed, while at the first-speed-gear-side portion thereof, a hollow portion 18h is formed. The projecting portions 18e are formed with a spring groove 18i on an inner side in the radial direction to receive the second spring 29. The projecting portions 18e are inserted in the cut-off portions 20f with a certain play in the rotational direction therebetween, and the second grooves 18f receive the thrust pieces 30 with a certain play in the rotational direction therebetween.

Figure 14:
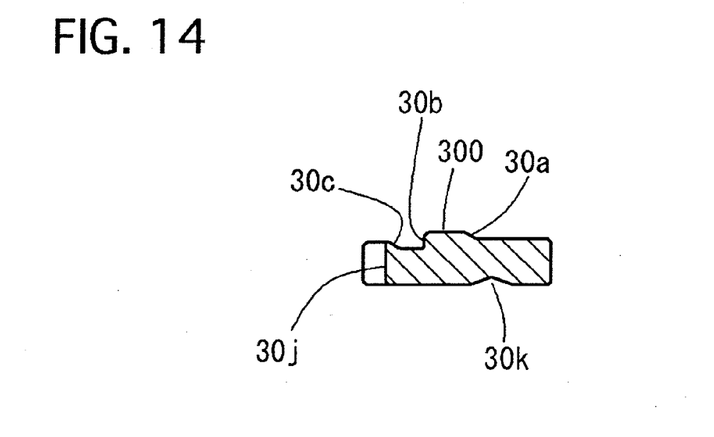
FIG. 14 is a development elevation showing a position relationship among the synchronizer rings, the sleeve, the hub and the thrust piece.
Figure 15:
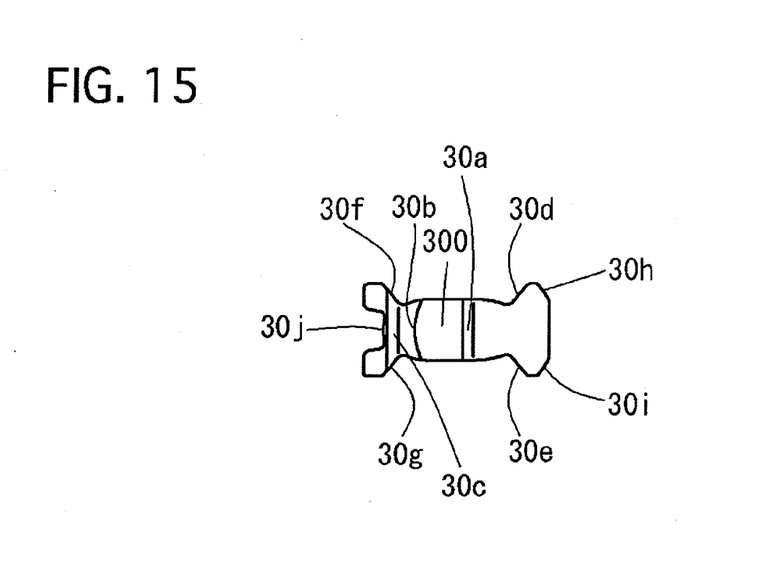
FIG. 15 is a development elevation showing a position relationship between the thrust piece and the synchronizer rings, removing the sleeve in FIG. 14.

FIGS. 14 and 15 show the thrust piece 30, which is formed like a letter I seen from the outside in the radial direction. The thrust pieces 30 have a projecting portion 300 extending outwardly in the radial direction from the outer surface thereof and engageable with the depressed portions 24h of the sleeve 24 as shown in FIG. 3. The projecting portion 300 has a first slanted surface 30a at the first-speed-gear side thereof, and a pressed surface 30b at the second-speed-gear side thereof. The first slanted surface 30a is engageable with the first slanted surface 24e of the sleeve 24, and the pressed surface 30b is engageable with the pressing surface 24g of the sleeve 24. The thrust pieces 30 have a second slanted surface 30c at the second-speed-gear side thereof on the outer surface. The second slanted surface 30c is engageable with the third slanted surface 24i of the sleeve 24. The pressed surface 30b is perpendicular to the outer surface of the thrust piece 30. The first slanted surface 30a and the second slanted surface 30c are slanted relative to the outer surface of the thrust piece 30 in the axial direction.

The thrust pieces 30 have first servo slanted surfaces 30d and 30e at the first-speed-gear side thereof and second servo slanted surfaces 30f and 30g at the second-speed-gear side thereof. The first servo surfaces 30d and 30e and the second servo surfaces 30f and 30g correspond to the first slanted surfaces 20h and 20i and the second slanted surfaces 20j and 20k of the hub 20, respectively. The first-speed-gear-side edge portions of the thrust pieces 30 have baulked slanted-surfaces 30h and 30i. The second-speed-gear-side end portions of the thrust pieces 30 have a pressing surface 30j that presses the pressed portion 18g under the synchronization function. The pressed surface 30b, the first servo slanted surfaces 30d and 30e, the second servo slanted surfaces 30f and 30g, the baulked slanted-surfaces 30h and 30i and the pressing surface 30j preferably are formed to have gentle curved surfaces, not plane surfaces.

Further, the thrust pieces 30 have a hollow portion 30k on an inner surface thereof so as to engage with a projecting portion 32a of plate 32 as shown in FIG. 3.

The plates 32 are formed like a rectangular shape seen from the outside in the radial direction. As shown in FIG. 3, the plates 32 have a first slanted surface 32b and a second slanted surface 32c on an inner surface thereof. The first slanted surface 32b and the second slanted surface 32c receive the first spring 28 and the second spring 29, respectively. The first and second springs 28 and 29 apply their tensions to the plates 32 to push the plates 32 outwardly in the radial direction.

Accordingly, the first slanted surface 32b and the second slanted surface 32c are formed to slant in such a way that the tensions of the first spring 28 and the second spring 29 act on the plates 32 to always pull back the plates 32 toward the flange portion 20c of the hub 20. The bottoms of the first and second slanted surfaces 32b and 32c are formed to receive the first and second springs 28 and 29, respectively. The tensions of the first spring 28 and the second spring 29 further act on the first synchronizer ring 16 and the second synchronizer ring 18 to always pull back the first and second synchronizer rings 16 and 18 toward the flange portion 20c of the hub 20.

Figure 16:
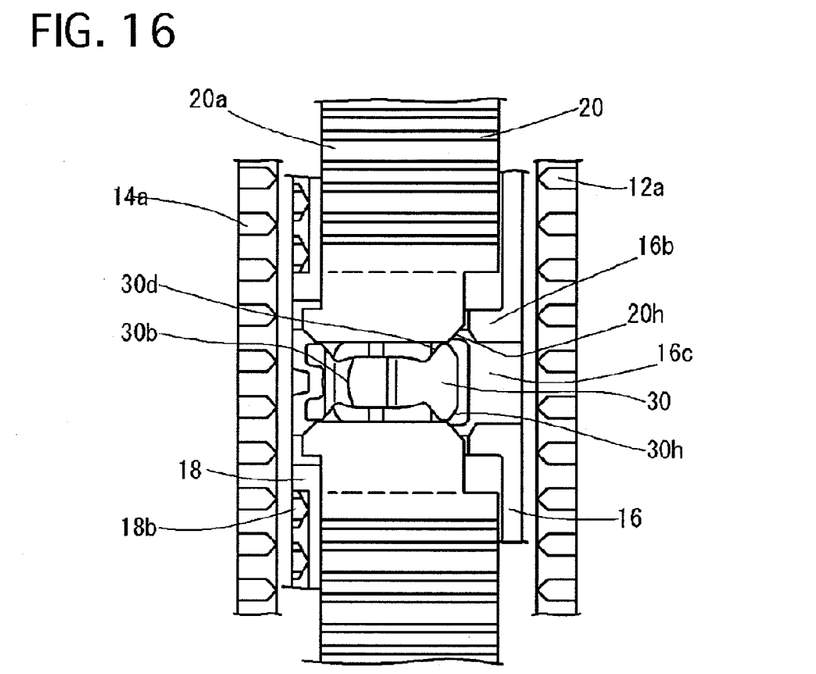
FIG. 16 is a development elevation showing a state of the shift device when the sleeve is kept at a neutral position.

The operation of the shift device of the embodiment will be described. FIGS. 1, 3 and 16 shows a state where the sleeve 24 is positioned at the neutral position. In this state, the splines 24a of the sleeve 24 engage with the splines 20e of the hub 20, but they are free from the splines 12a of the first speed gear 12 and the splines 14a of the second speed gear 14. As a result, the input shaft is separated from the output shaft 10.

In addition, at the neutral position, the first synchronizer ring 16 and the second synchronizer ring 18 are always pulled toward the flange portion 20c of the hub 20 by the first and second springs 28 and 29. Thus, the friction surface 12a of the first speed gear 12 and the friction surface 16a of the first synchronizer ring 16 are kept in non-contact with each other, and similarly the friction surface 14b of the second speed gear 14 and the friction surface 18a of the second synchronizer ring 18 are kept in non-contact with each other. In other words, no synchronization function is produced in the shift device at the neutral state.

In order to shift the shift device from the neutral state to the first gear, the sleeve 24 is moved toward the first speed gear 12 by the shift fork. The thrust pieces 30, the plates 32, the spring 28 and the first synchronizer ring 16 are moved toward the first speed gear 12 by and together with the sleeve 24. Specifically, the pressing surfaces 24g of the sleeve 24 push the pressed surfaces 30b of the thrust pieces 30 toward the first speed gear 12. The hollow portions 30k of the thrust pieces 30 push the projecting portions 32a of the plates 32 toward the first speed gear 12. The bottoms of the plates 32 deform the first spring 28 toward the first speed gear 12 to bring it together.

In this operation, the second synchronizer ring 18 also contacts with the flange portion 20c of the hub 20 to be prevented from moving toward the first speed gear 12. Consequently, the second spring 29 also cannot move toward the first speed gear 12, and instead the second spring 29 deforms inwardly in the radial direction to some extent, thereby allowing the plates 32, the thrust pieces 30, the spring 28 and the first synchronizer ring 16 to move toward the first speed gear 12. As these parts moves toward the first speed gear 12, the friction surface 16a of the first synchronizer ring 16 contacts with the friction surface 12a of the first speed gear 12. This contact stops the first synchronizer ring 16 and the spring 28 to move further.

On the other hand, the thrust pieces 30 and the plates 32 further move toward the first speed gear 12 together with the sleeve 24, and the first-speed-gear-side end portions of the plates 32 contact with the hollow portion 16f of the first synchronizer ring 16. The first and second springs 28 and 29 apply tension to the plates 32 to push the first synchronizer ring 16, so that friction torque generates between the friction surfaces 12b and 16a to start initial synchronization function.

Figure 17:
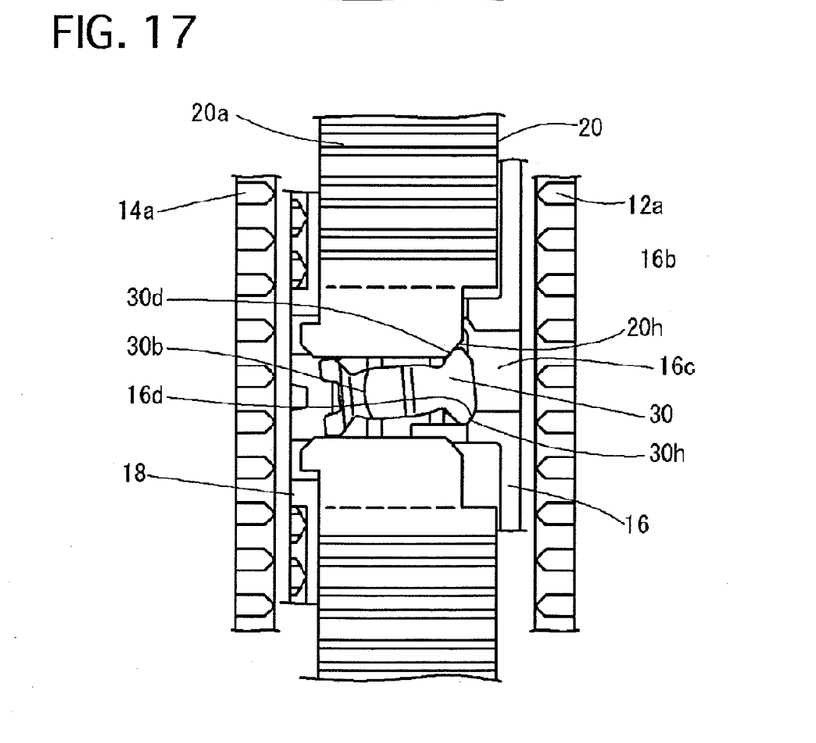
FIG. 17 is a cross-sectional plan view showing a state of the shift device where friction torque between an output shaft and the first speed gear generates to turn the synchronizer ring so that the thrust pieces swing and contact with the hub when the sleeve is moved from the neutral position toward a first speed gear.

The friction torque rotates the first synchronizer ring 16 relative to the hub 20 in the rotational direction so that the first groove 16c of the first synchronizer ring 16 swings the thrust pieces 30 as shown in FIG. 17. Specifically, in this state, the thrust pieces 30 move apart from their neutral positions toward the first speed gear 12, where the second-speed gear-side end portions of the thrust pieces 30 are within the cut-off portions 20f of the hub 20 and the first-speed-gear-side end portions thereof are out of the cut-off portions 20f. As a result, the first-speed-gear-side end portions of the thrust pieces 30 swing around the second-speed-gear-side end portions thereof, which function as fulcrums, as shown in FIG. 17. The swing movement of the thrust pieces 30 causes the servo slanted surfaces 30d of the thrust pieces 30 to contact with the first slanted surfaces 20b of the hub 20, so that the friction torque acting on the first slanted surface 20b through the first servo slanted surface 30d is changed into thrust.

At the same time, as shown in FIG. 17, the baulked slanted-surfaces 30h of the thrust pieces 30 contact with the baulking slanted-surfaces 16d of the first synchronizer ring 16 to start to push the first synchronizer ring 16 on the first speed gear 12. In this state, the thrust pieces 30 are pushed toward the first speed gear 12 directly by the pressing portions 24g of the sleeve 24, although the thrust pieces 30 and the sleeve 24 are restricted from further moving toward the first speed gear 12 during the synchronization. In addition, the thrust pieces 30 are pushed toward the first speed gear 12 by thrust generated due to the friction torque through the first servo slanted surfaces 30d of the thrust pieces 30 and the first slanted surfaces 20h of the hub 20.

After all, the first synchronizer ring 16 is pressed by the resultant thrust consisting of a first thrust directly applied from the sleeve 24 to the synchronizer ring 16 and a second thrust generated by the friction torque due to self-servo function. This improves the synchronization performance by the amount of the second thrust.

Figure 18:
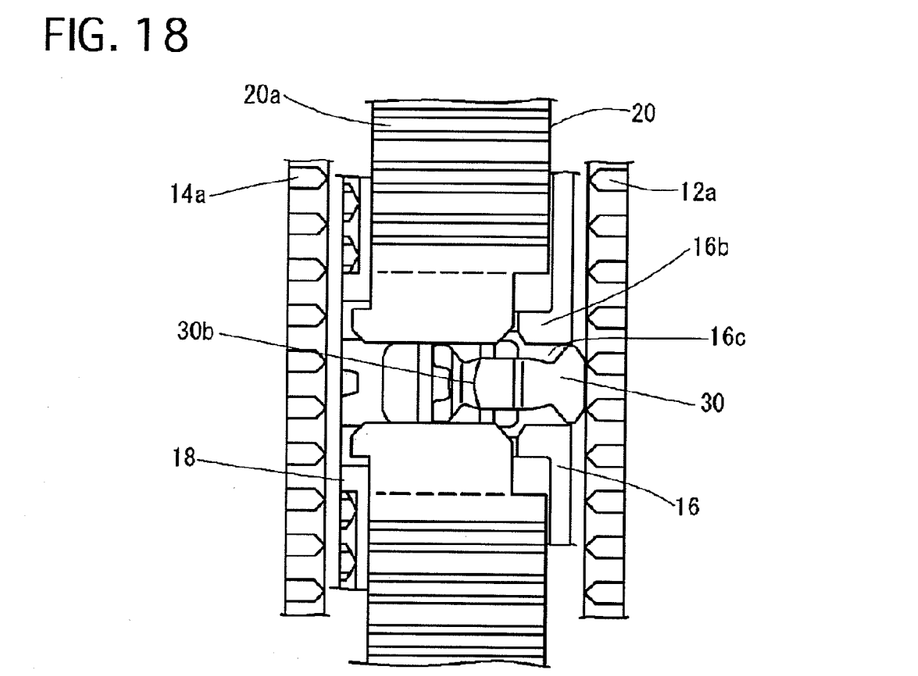
FIG. 18 is a development elevation showing a state of the shift device where the friction torque disappears and the sleeve is turned back so that the thrust pieces move together with the sleeve toward the first speed gear.

The synchronization function gradually decreases the rotational-speed difference between the output shaft 10 and the first speed gear 12, thereby gradually decreasing the friction torque. As the friction torque becomes substantially zero, the thrust pieces 30 push back the first synchronizer ring 16 to the same position in the rotational direction as the neutral position, and then the thrust pieces 30 start to move toward the first speed gear 12 together with the sleeve 24 as shown in FIG. 18. The sleeve 24 further moves together with the thrust pieces 30 toward the first speed gear 12 because the pressing surfaces 24g of the sleeve 24 and the pressed surfaces 30b of the thrust pieces 30 are not slanted. Finally, the splines 24a of the sleeve 24 engage with the splines 12a of the first speed gear 12. This is the end of the shift operation from the neutral state to the first gear by the shift device.

Next, in order to shift the shift device from the neutral state to the second gear, the sleeve 24 is moved toward the second speed gear 14. At the beginning of this operation, the rotational speed difference is considered to exist between the output shaft 10 and the second speed gear 14.

As the sleeve 24 moves toward the second speed gear 14, the thrust pieces 30, the plates 32, the spring 29 and the second synchronizer ring 18 moves toward the second speed gear 14 together with the sleeve 24.

The thrust pieces 30 are pressed toward the second speed gear 14 by the sleeve 24 through the first slanted surfaces 30a of the thrust pieces 30 and the first slanted surfaces 24e of the sleeve 24, because the thrust pieces 30 are pushed on the sleeve 24 by the first and second springs 28 and 29.

In this state, as the first synchronizer ring 16 contacts with the flange portion 20c of the hub 20 to be prevented from moving toward the second speed gear 14, and the first spring 28 deforms inwardly in the radial direction to some extent, thereby allowing the thrust pieces 30, the plates 32, the spring 29 and the second synchronizer ring 18 to move toward the second seed gear 14.

As these parts move toward the second speed gear 14, the friction surface 18a of the second synchronizer ring 18 contacts with the friction surface 14b of the second speed gear 14. This contact stops the second synchronizer ring 18 and the second spring 29 from moving further.

On the other hand, the thrust pieces 30 and the plates 32 further move toward the second speed gear 14 together with the sleeve 24, deforming the second spring 29 toward the second speed gear 14. Then, the second-speed-gear side end portions of the plates 32 contact with the hollow portion 18f of the second synchronizer ring 18. The plates 32 push the second synchronizer ring 18 toward the second speed gear 18 due to tension of the first and second springs 28 and 29, so that friction torque generates between the friction surface 14b of the second speed gear 14 and the friction surface 18a of the second synchronizer ring 18 to start the initial synchronization function.

Figure 19:
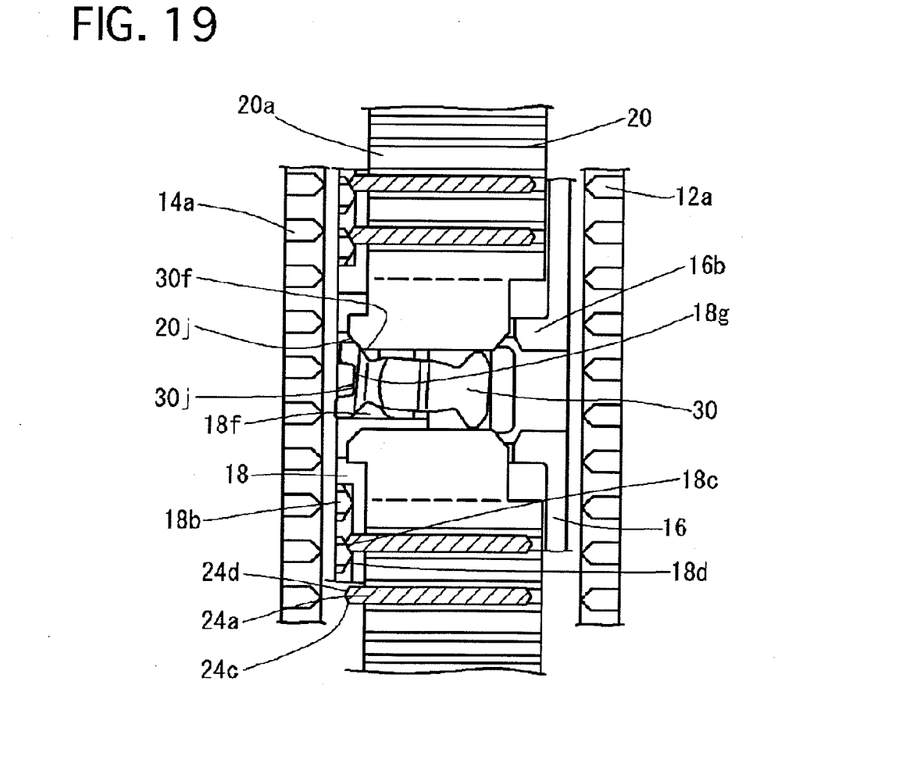
FIG. 19 is a cross-sectional view showing the state of the shift device where friction torque generates to turn the synchronizer ring so that the thrust pieces swing and contact with the hub when the sleeve is moved from the neutral position toward a second speed gear.

The friction torque rotates the second synchronizer ring 18 in the rotational direction relative to the hub 20 to a position shown in FIG. 19. As the sleeve 24 moves further toward the second speed gear 14, the second-speed-gear-side chamfers 24c of the sleeve 24 contact with the chamfers 18c of the second synchronizer ring 18. The sleeve 24 keeps pushing the second synchronizer ring 18 toward the second speed gear 14 through the chamfers 24c and 18c to perform the synchronization function.

Specifically, the chamfers 24c and 18c are designed so that the thrust directly applied from the sleeve 24 to the second synchronizer ring 18 becomes smaller than force that pushes back the sleeve 24 toward the first speed gear 12 through the chamfers 24c and 18c due to the friction torque generated between the friction surfaces 14b and 18c. Therefore, as far as the friction torque due to the synchronization function exists, the sleeve 24 is prevented from moving toward the second speed gear 14, maintaining to push the second synchronizer ring 18.

In this state, the thrust pieces 30 are swung due to the friction torque difference (T2) through the second groove 18f thereof, where the friction torque difference (T2) is the excessive amount of the difference between the friction torque generated between the friction surfaces 14a and 18a and the torque generated through the chamfers 24j of the sleeve 24 and the chamfers 18c of the second synchronizer ring 18 to rotate the second synchronizer ring 18 in a direction opposite to a rotational direction of the friction torque.

In other words, as the thrust pieces 30 are positioned from the neutral position toward the second speed gear 14, the second-speed-gear-side end portions thereof are within the cut-off portions 20f of the hub 20, and the first-speed-gear-side end portions thereof are out of the cut-off portions 20f. As a result, the second-speed-gear-side end portions of the thrust pieces 30 swing around the first-speed-gear-side end portions functioning as the fulcrums as shown in FIG. 19. The second servo slanted surfaces 30f of the thrust pieces 30 contact with the second slanted surfaces 20j of the hub 20 as shown in FIG. 19, and the friction torque difference (T2) acts on the hub 20 through the second servo slanted surfaces 30f and the second slanted surfaces 20j.

Accordingly, the friction torque difference is changed to thrust through the slanted surfaces 30f and 20j so that the thrust pieces 30 are pressed toward the second speed gear 14, and the pressing surfaces 30j of the thrust pieces 30 push the pressed portions 18g of the second synchronizer ring 18 toward the second speed gear 14.

After all, the second synchronizer ring 18 is pushed toward the second speed gear 14 by the resultant thrust consisting of the direct thrust acting from the sleeve 24 through the chamfers 24c and 18c and the thrust acting from the thrust pieces 30 through the surfaces 30j and 18g due to the friction torque difference acting on the slanted surfaces 30f and 20j. Therefore, the shift device of the embodiment can obtain the synchronization performance suitable for the shift operation from the neutral state to the second gear, because its synchronization performance becomes lower than that of the shift operation from the neutral state to the first gear, improving the synchronization performance by the amount obtained by the latter thrust than those of conventional shift devices.

Figure 20:
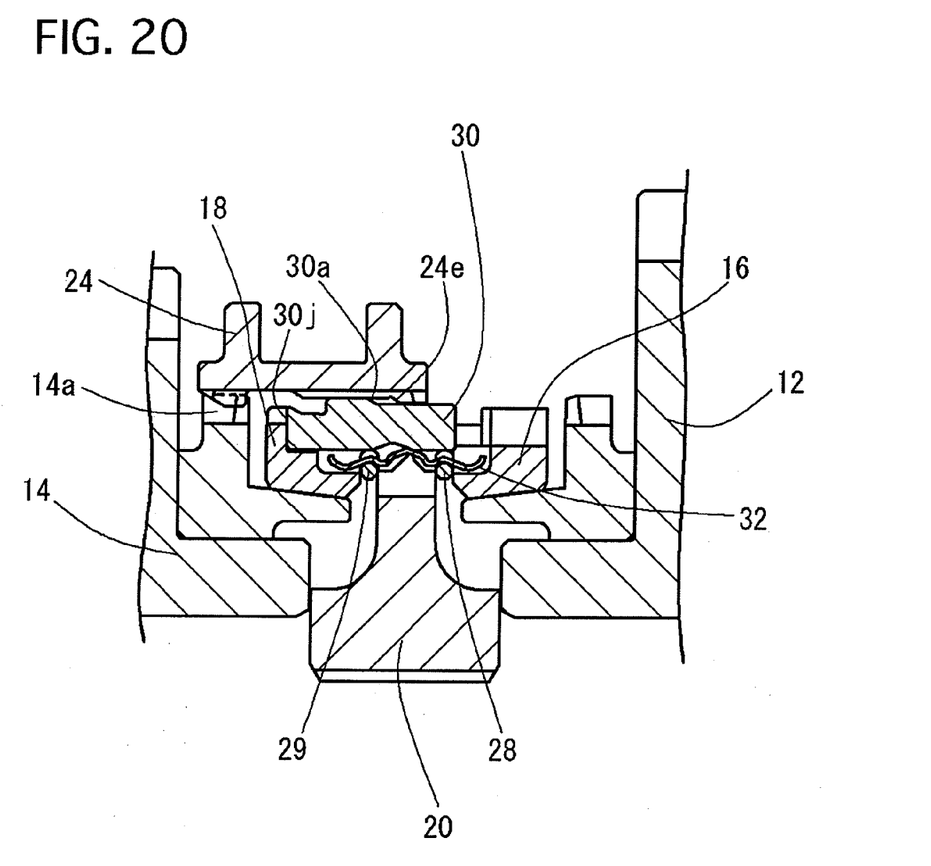
FIG. 20 is a cross-sectional plan view showing the state of the shift device when the gear shifting toward the second speed gear is finished

The synchronization function decreases the rotational speed difference between the output shaft 10 and the second speed gear 14. When the rotational speed difference becomes substantially zero, the friction torque due to the synchronization function becomes substantially zero. In this state, the sleeve 24 rotates back the second synchronizer ring 18 to the same position as the neutral position through the chamfers 24c and 18c. The sleeve 24 further moves toward the second speed gear 14, pressing to move the thrust pieces 30 inwardly in the radial direction against the first and second spring 28 and 29 through the third slanted surfaces 24i and the second slanted surfaces 30c. Then, the splines 24a of the sleeve 24 engage with the splines 14a of the second speed gear 14 as shown in FIG. 20. This is the end of the shift operation from the neutral state to the second gear by the shift device.

At the second gear position, the thrust pieces 30 move from the state shown in FIG. 20 toward the first speed gear 12, but they are restricted from further moving after the first slanted surfaces 30a of the thrust pieces 30 contact with the second slanted surfaces 24f of the sleeve 24. Therefore, the second slanted surfaces 24f prevent an unexpected contingency caused by the thrust pieces 30 moving toward the first speed gear 12.

As understood from the above-described explanation, the shift device of the embodiment has the following advantages.

The shift device of the embodiment is constructed so that the thrust pieces 30 move together with the sleeve 20 in the shift operation to the first gear, while they are moving inwardly in the radial direction halfway in the shift operation to the second gear. This enables the shift device of the embodiment to provide different self-servo functions between shift operations to obtain the first gear and second gear only with three thrust pieces 30, improving the synchronization performances relative to those of the conventional shift devices. In addition, the hub 20 can be easily formed by using a sintering method or the like. Therefore, manufacturing costs of the shift device can be decreased.

The first synchronizer ring 16 and the second synchronizer ring 18 are pulled toward the flange portion 20c of the hub by the first and second springs 28 and 29. This keeps the friction surfaces 16a and 18a away from the friction surface 12b of the first speed gear 12 and the friction surface 14b of the second speed gear 14. Accordingly, generation of dragging torque and heat can be prevented, and fuel efficiency can be improved.

While the invention has been particularly shown and described with reference to preferred embodiments thereof, it will be understood that various modifications may be made therein, and it is intended to cover in the appended claims all such modifications as fall within the true spirit and scope of the invention.

The shift device with the synchronizer is mounted on the output shaft 10 in the embodiment, but it may be mounted on an input shaft.

The first slanted surfaces 20h and 20i and the second slanted surfaces 20j and 20k of the hub 12 may be formed as helical surfaces and the like.

The shift device has the first speed gear 12 and the second speed gear 14 in the embodiment, but the speed gear may be a different speed gear.

The synchronizer ring 24 may have an oil groove on its inner friction surface in order to increase a friction coefficient of the friction surface, and may be made of material for improving synchronizing performance.

The shift device of the invention may be applied to a multi-cone type synchronizer, which has more than one set of friction surfaces for one speed gear.

The shift device may be manually operated, or mechanically operated by an actuator.

The entire contents of Japanese Patent Application No. 2009-090905 filed April, 2009 are incorporated herein by reference.

What is claimed is:

1. A shift device adapted for a transmission, comprising:
a shaft for transmitting drive power;
a hub having a boss portion splined with said shaft, an annular portion located outwardly away from said boss portion, said annular portion having an outer peripheral surface that has splines formed thereon, and a flange portion connecting said boss portion and said annular portion, wherein said annular portion and said flange portion have a plurality of cut-off portions, said plurality of cut-off portions have two edge portions on one side thereof and two edge portions on another side thereof, and said two edge portions on the one side thereof comprising first slanted surfaces for changing rotational force to thrust;
a sleeve having splines on an inner surface thereof and a plurality of depressed portions having a pressing surface, a first slanted surface and a second slanted surface, said sleeve being supported by and slidable along said splines of said hub;
a pair of speed gears arranged to sandwich said hub, each of said speed gears having splines engageable with said splines of said sleeve and a friction surface at a side thereof facing said hub;
a first synchronizer ring having a friction surface on an inner surface thereof and first grooves on an outer surface thereof, said friction surface being arranged so as to be pressed on said friction surface of one of said speed gears, said first grooves having a slanted surface on an outer surface extending in an axial direction of said shift device, and said first synchronizer ring being arranged between said hub and the one of said speed gears;
a second synchronizer ring having a friction surface on an inner surface thereof and splines and second grooves on an outer surface thereof, said friction surface of said second synchronizer ring being pressed on said friction surface of the other of said speed gears, wherein said splines of said second synchronizer ring have chamfers, said second grooves extend in an axial direction, and said second synchronizer ring is disposed between said hub and the other of said speed gears;
a plurality of thrust pieces each having a pressed surface and a slanted surface on an outer surface thereof, which are contactable with said pressing surface and said first slanted surface of said sleeve, respectively, to be pressed in the axial direction, and said plurality of thrust pieces each being formed with a surface that is contactable with said slanted surface of said first synchronizer ring and formed with a first servo slanted surface contactable with one of said first slanted surfaces of said hub, wherein said thrust pieces are insertable into said depressed portions of said sleeve, said first grooves of said first synchronizer ring and said second grooves of said second synchronizer ring, and wherein said thrust pieces are disposed in respective said cut-off portions of said hub so as to be slidable therein in the axial direction; and
a pair of springs pushing said plurality of thrust pieces outwardly in a radial direction of said shift device, wherein:
said thrust pieces are arranged so as to move together with said sleeve through the entire motion of said sleeve when said sleeve is moved toward the one of said speed gears in a first synchronization operation, said pressed surface of said thrust pieces contacting with said pressing surface of said sleeve so as to press said first synchronizer ring in said first synchronization operation;
said thrust pieces are arranged so as to move together with said sleeve for only part of the motion of said sleeve when said sleeve is moved toward the other of said speed gears in a second synchronization operation, with said slanted surface of said thrust pieces contacting with said first slanted surface of said sleeve in said second synchronization operation; and
said thrust pieces are arranged so as to move inwardly in the radial direction against the force of said first and second springs, said slanted surfaces of said thrust pieces contacting with said second slanted surface of said sleeve so as to be prevented from further movement in said second synchronization operation when said sleeve has only moved the part of the motion toward the other of said speed gears.

2. The shift device of claim 1, wherein:
said thrust pieces have a second servo slanted surface;
said two edge portions on one side of said cut-off portions are opposite to said two edge portions on the other side of said cut-off portions in the axial direction; and
said two edge portions on the other side of said cut-off portions have second slanted surfaces engageable with said second servo slanted surfaces of said thrust pieces to change rotational force into thrust force.

3. The shift device of claim 2, wherein:
said thrust pieces have the shape of the letter I as seen from outside of shift device looking radially inward, end portions on one side thereof and end portions on another side thereof; and
said end portions on the one side of said thrust pieces are contactable with said cut-off portions of said hub so as to act as a fulcrum and said end portions on the other side of said thrust pieces are swingable.

4. The shift device of claim 3, wherein:
some of said splines on said inner surface of said sleeve have a stepped portion that restricts said thrust pieces from moving one way in the axial direction when said sleeve is moved the other way in the axial direction.

5. The shift device of claim 4, wherein:
said thrust pieces have a hollow portion on an inner surface thereof;
plates are disposed between said thrust pieces and said first and second springs, respectively; and
said plates have slanted surfaces receiving said first spring and said second spring, respectively, and a projecting portion engageable with said hollow portion on said inner surface of said thrust pieces, respectively.

6. The shift device of claim 3, wherein:
said thrust pieces have a hollow portion on an inner surface thereof;
plates are disposed between said thrust pieces and said first and second springs, respectively; and
said plates have slanted surfaces receiving said first spring and said second spring, respectively, and a projecting portion engageable with said hollow portion on said inner surface of said thrust pieces, respectively.

7. The shift device of claim 2, wherein:
some of said splines on said inner surface of said sleeve have a stepped portion that restricts said thrust pieces from moving one way in the axial direction when said sleeve is moved the other way in the axial direction.

8. The shift device of claim 7, wherein:
said thrust pieces have a hollow portion on an inner surface thereof;
plates are disposed between said thrust pieces and said first and second springs, respectively; and
said plates have slanted surfaces receiving said first spring and said second spring, respectively, and a projecting portion engageable with said hollow portion on said inner surface of said thrust pieces, respectively.

9. The shift device of claim 2, wherein:
said thrust pieces have a hollow portion on an inner surface thereof;
plates are disposed between said thrust pieces and said first and second springs, respectively; and
said plates have slanted surfaces receiving said first spring and said second spring, respectively, and a projecting portion engageable with said hollow portion on said inner surface of said thrust pieces, respectively.

10. The shift device of claim 1, wherein:
said thrust pieces have the shape of the letter I as seen from outside of shift device looking radially inward, end portions on one side thereof and end portions on another side thereof; and
said end portions on the one side of said thrust pieces are contactable with said cut-off portions of said hub so as to act as a fulcrum and said end portions on the other side of said thrust pieces are swingable.

11. The shift device of claim 10, wherein:
some of said splines on said inner surface of said sleeve have a stepped portion that restricts said thrust pieces from moving one way in the axial direction when said sleeve is moved the other way in the axial direction.

12. The shift device of claim 11, wherein:
said thrust pieces have a hollow portion on an inner surface thereof;
plates are disposed between said thrust pieces and said first and second springs, respectively; and
said plates have slanted surfaces receiving said first spring and said second spring, respectively, and a projecting portion engageable with said hollow portion on said inner surface of said thrust pieces, respectively.

13. The shift device of claim 10, wherein:
said thrust pieces have a hollow portion on an inner surface thereof;
plates are disposed between said thrust pieces and said first and second springs, respectively; and
said plates have slanted surfaces receiving said first spring and said second spring, respectively, and a projecting portion engageable with said hollow portion on said inner surface of said thrust pieces, respectively.

14. The shift device of claim 1, wherein:
some of said splines on said inner surface of said sleeve have a stepped portion that restricts said thrust pieces from moving one way in the axial direction when said sleeve is moved the other way in the axial direction.

15. The shift device of claim 14, wherein:
said thrust pieces have a hollow portion on an inner surface thereof;
plates are disposed between said thrust pieces and said first and second springs, respectively; and
said plates have slanted surfaces receiving said first spring and said second spring, respectively, and a projecting portion engageable with said hollow portion on said inner surface of said thrust pieces, respectively.

16. The shift device of claim 1, wherein:
said thrust pieces have a hollow portion on an inner surface thereof;
plates are disposed between said thrust pieces and said first and second springs, respectively; and
said plates have slanted surfaces receiving said first spring and said second spring, respectively, and a projecting portion engageable with said hollow portion on said inner surface of said thrust pieces, respectively.

* * * * *